United States Patent Office 3,222,202
Patented Dec. 7, 1965

3,222,202
CARBON BLACK PROCESS
Merrill E. Jordan and Harvey M. Cole, Walpole, Mass., assignors to Cabot Corporation, Boston, Mass., a corporation of Delaware
No Drawing. Filed May 21, 1962, Ser. No. 196,455
9 Claims. (Cl. 106—307)

This invention relates to the production of carbon black and in particular to an improved method of producing desirable carbon black products.

Commercially carbon black is produced by the thermal decomposition of carbon containing materials which are essentially hydrocarbon in nature. The thermal decomposition of the carbonaceous material can be achieved by various processes such as open flame decomposition (impingement or channel), enclosed direct flame decomposition (furnace), stored heat decomposition (cyclical thermal furnace), externally heated surfaces (continuous thermal) or detonation or internal combustion processes (engine or energy utilizing systems) etc. The basic properties of a black and therefore the performance characteristics exhibited thereby in the applications thereof are determined in large measure by the particular process by which it is produced. For example, channel blacks are generally characterized by high surface area, low structure, high volatile content and low pH, and are particularly suitable for use as coloring agents, and as reinforcing agents in rubber. A carbon black produced by the furnace process on the other hand, may be produced over a wide range of closely controlled particle sizes and accordingly is adaptable as a filler for various synthetic rubbers and plastics. Also, variations in the fuels and reaction conditions used in the above processes can influence the properties of the black produced. Such essentially is the present degree of flexibility of variables involved in the production of carbon black and these although limited, nevertheless permit the production of the many types of carbon black now being utilized in a wide and ever expanding variety of commercial applications.

Despite the fact that, by utilizing and manipulating the variables mentioned above, the properties of a produced black may be varied and reasonably predicted or controlled, there are still intrinsic variables, e.g. changes in the quality of the raw material, which render difficult the precise day to day control of the ultimate properties of the final product produced. This is especially true when a carbon black is produced for some specific application and must consistently, uniformly and within very narrow tolerances impart a certain property or set of properties to the products in which it is used. Accordingly, it would be most desirable and valuable to have simple, independent methods of controlling and adjusting particular properties of the carbon black products so as to permit the uniform controlled production consistently of an ultimate desired product of predetermined properties or a product having certain properties precisely and selectively modified.

One of the many applications of carbon blacks is as a pigment in paints, inks and plastics. In such applications especially in paints and inks, the tinting strength of the black is of considerable, if not paramount, importance in the development of high color. The "tinting strength" or "tinctorial power" of a particular carbon black describes the hiding or obscuring power thereof. In present practice this power generally is measured by a method, which will be described in detail hereinafter, in which the power of a black pigment to tint a given white pigment is compared with that of a standard black.

It is well known in the art that the particle diameter of a carbon black is generally considered to be the chief factor in determining the tinting strength thereof with the tinting strength increasing as particle size decreases. In turn, the particle size of a carbon black is, as stated, determined primarily by the process by which the particular black is produced. Accordingly, channel blacks, which generally have the smallest average particle size of all blacks, have in the past enjoyed wide application as high color carbon black pigments. However, even though in the past channel type blacks were the most dominant type produced, the advent of the furnace process and the ever increasing costs of natural gas has caused the production of channel blacks to constantly diminish and many in the art believe that the channel process itself will ultimately become extinct. On the other hand, the furnace blacks which are generally coarser in particle size presently enjoy some use as pigments in inks and paints but as a rule are considered to be somewhat inferior in tinctorial power to most channel blacks. Thus, it will be obvious that any process whereby the tinting power of any of the diverse furnace blacks may be selectively improved by a predetermined degree, and/or uniformly controlled within very close tolerances would be a notable contribution to the art.

The fundamental object of the present invention is to provide a novel process for adjusting and controlling the properties of a carbon black to meet prescribed and predetermined requirements.

Another object of the present invention is to provide a novel and simple process for producing furnace carbon black pigments having improved tinting strength which process at the same time permits the production of carbon blacks which retain unimpaired other properties inherently characteristic of the black.

A further object of the present invention is to provide a simple process for compensating for variables in hydrocarbon raw materials so as to avoid serious deviations in quality of the furnace black produced.

Still another object of the present invention is to provide a process whereby a desirable furnace carbon black may be produced which consistently and within very narrow tolerances exhibits predetermined properties.

Still other objects and advantages of the present invention will in part be obvious and will in part appear hereinafter.

We have discovered a simple yet very effective process for producing furnace carbon blacks of an improved and selectively predetermined degree of tinting strength.

In accordance with our invention the above objects and advantages are realized by introducing into the furnace reaction zone in which the black is being formed from the make hydrocarbon, a minor amount of an additive containing the element, zinc, either in the elemental or the chemically combined state.

The exact amount of a particular additive comprising the above-mentioned element used in accordance with the teachings of the present invention will depend primarily upon the degree of adjustment desired in the properties of the final carbon black product.

Although the addition of less than 100 parts by weight of zinc per million parts of make fuel may effect slight changes in the resultant black which may be significant for quality control purposes, we have found that the use of such amounts evidently do not effect any major improvement in tinting strength of the resulting black. However, above concentrations of 500 parts of additive zinc per million parts of make, the increased effect on the tinting strength of the resutling black appears to be a function of the amount of additive utilized. Also, we have found that the amount of the additive element which remains associated with the finished black is, for a given method of addition, largely a function of the concentration of additive utilized but is usually only a small fraction of the total amount added. Accordingly, one can also effectively utilize the process disclosed in this invention to produce furnace blacks containing varying amounts of zinc. Such discoveries indicate that the upper limit of the amount of the particular additive utilized in accordance with the teachings of the present invention will be dictated by the ultimate properties desired in the final carbon black, e.g. ultimate structural properties and/or ultimate metal content thereof. However, from a practical and economical viewpoint, that is, in order to avoid the use of special and costly equipment, or modification of the furnace combustion zone, etc. we have found that it would not be desirable to operate with an amount of additive sufficient to supply above about 50,000 parts by weight of zinc per million parts by weight of make fuel. Accordingly, although the amount of additive utilized in accordance with the teachings of this invention may, for some limited purposes, cover amounts up to about 100,000 parts of zinc, or even higher, nevertheless the preferred embodiment of the present invention contemplates the use of from about 300 parts to about 25,000 parts of zinc per million parts of make fuel.

In addition to the controlled production of blacks having an improved tinting strength our process may also be utilized to produce a carbon black having varying amounts of zinc intimately combined therewith. By introducing the additive compound to the reaction or conversion zone wherein the carbon black exists at its inception as an active radical, that is by having the additive present while the black is being created and exists in its "status nascendi," the metal component of the additive has an opportunity to become intimately admixed or associated with the finished black product. In fact, it has been found that in carbon black produced in accordance with the present invention the zinc is substantially uniformly distributed within the lattice structure of the black.

Broadly, the additives contemplated within the scope of the present invention are elemental zinc and any of the compounds thereof which will decompose at temperatures below the temperature of the furnace carbon forming reaction involved, e.g. generally about 2000° C. or higher. However, the preferred additives are those compounds of zinc which are soluble, or dispersible or suspendible in a carrier such as water, aqueous media, or organic media including the hydrocarbon raw materials from which the black is being made or in the vapors or gases which are ordinarily added to the carbon conversion zone. More particularly, we strongly prefer the water soluble compounds of zinc. Accordingly, examples of the preferred compounds of our invention are the various inorganic salts such as the chlorides, sulfates, carbonates, etc., of zinc. Other compounds which are particularly suitable for the purposes of the present invention are the various complexes and metallo-organic compounds thereof such as its salts of organic acids. The control over the amount of the additive compound introduced to the reaction zone either alone or admixed with the make fuel or with the oxidizing media may be readily achieved by any of the metering or regulating systems or the like well known to the art.

Hereinafter, follow a number of non-limiting, illustrative examples. Unless otherwise specified, the properties of the carbon blacks listed in the examples were determined as follows:

*Nigrometer scale.*—The nigrometer scale of a carbon black is determined by utilizing an instrument as described in U.S. Patent 1,780,231. The instrument is used to measure the intensity of the blackness of a paste made by mixing 0.25 gram of the black being tested in 3 cc. of No. 5201 Morrill linseed varnish.

*Oil absorption.*—The oil absorption procedure used is substantially the same as other such procedures used through the carbon black and rubber industries. It involves the stiff paste oil absorption technique in which one gram of carbon black is mixed with alkali refined linseed oil until a point is reached at which the mixture coheres in a rounded mass. This procedure is generally known as the Gardner method and results are reported in terms of pounds of oil required to wet 100 pounds of black.

Tint was determined by comparing the transmission measurements of a paste containing the blacks with that obtained from a standard. A Desichron photomultiplier was used to obtain transmission measurements of a smear (0.0015" thick) of a hand mulled paste containing 0.1 gram of the particular black being evaluated, 3.0 grams of zinc oxide, and 1.2 grams of linseed oil. The tint was calculated as follows:

$$\text{Tinting strength} = \frac{50}{\text{transmission of sample paste}} \times \text{tinting strength of standard}$$

EXAMPLE 1

Carbon black was produced in an experimental furnace wherein acetylene was used as raw material. The experimental furnace was equipped with a burner composed of 3 separate concentric annular tubes the upper openings of which converge at the burner tip. Acetylene was conducted through the outer annular space to the burner tip and thence to the conversion zone while the oxidizing media (air) was conducted through the adjacent inner annular space. The inner-most of the aforementioned concentric annular spaces in the burner consists of a capillary tube through which solutions of zinc chloride of various concentrations were added to the conversion zone at a controlled rate. The zinc chloride solution was made slightly acidic in order to prevent formation of zinc hydroxide which would cause plugging of the capillary tube. We prefer to maintain solutions of any of the compounds of the metals which may tend to hydrolyze under acidic conditions in order to avoid such transfer problems. The delivery of the solution to the conversion zone was accomplished by means of a "Zero-Max" variable speed torque convertor. The properties of the resulting furnace carbon blacks were measured and the following results were obtained.

TABLE 1

| Run No. | Conc. of zinc (parts per million parts of make) | Scale | Tint | Oil Absorp. (lbs. oil per 100 lbs. black) | $N^2$ surface area, $M^2$/gram | Percent yield |
| --- | --- | --- | --- | --- | --- | --- |
| 4382 | None | | 223 | | | |
| 4376 | None | 79.9 | 223 | 230 | | 19.4 |
| 4383A [1] | None | | 223 | 204 | 140 | |
| 4383B | 80 | | | 207 | | |
| 4383C | 160 | | | 190 | | |
| 4383D | 240 | | 225 | 200 | | |
| 4378 | 300 | 80.0 | 226 | | 135 | 19.9 |
| 4377 | 2,080 | 80.6 | 230 | | 146 | 19.3 |
| 4388 | 12,500 | 81.0 | 281 | | 136 | 19.8 |

[1] $ZnCl_2$ solutions contained 2.5 mls. concentrated HCl in 250 mls. of water. Run 4383A was conducted with a solution of 2.5 mls. concentrated HCl in 250 mls. of water being continuously added to conversion zone.

It will be noted from the above example that the most outstanding contribution of zinc as an additive to the carbon conversion zone is its ability to increase the tinting strength of the black being formed. In turn this ability to increase tinting strength is a direct function of the concentration of zinc added initially. Also, it will be noted from the data above—especially the scale values—that the increase in tint could not be attributed to a decrease in particle size.

Substantially the same results as those obtained above are realized when other compounds of zinc are utilized in the furnace process for producing carbon black from hydrocarbons. However, we have found that the use of amounts above about 12,500 parts of zinc with the make do not impart any significant degree of further improvement as far as tint is concerned to the final black. Obviously though, the amount of zinc associated with the black is increased as larger amounts of the compound are utilized.

EXAMPLE 2

Gray alkyd enamels were prepared according to the following formulation in which blacks from Runs 4–378, 4–382 and 4–388 of Example 1 above were utilized as black pigments.

*Formulation*

BLACK

The following ingredients were ground on a two roll mill for about 20 minutes.

32 grams 35% Aroplaz resin (Aroplaz is a short oil, non-drying alkyd resin)
8 grams black pigment
25 grams xylol Thereafter 325 grams of 60% Aroplaz resin were blended with the above mill paste.

WHITE BASE

The following ingredients were ground in a ball mill for 24–48 hours.

|  | Grams |
|---|---|
| $TiO_2$ | 300 |
| 50% Aroplaz | 300 |
| Xylol | 150 |

The gray alkyd enamel was prepared by mixing 8 grams of the black (enamel base) with 100 grams of the white base.

Color and tone were determined on glass panel drawdowns of the gray enamels using the "Coloreye" produced by Instrument Development Laboratories, Inc., of Attleboro, Massachusetts, and described in detail in their "Instruction Manual No. 1000 G for Model D. Coloreye."

The "Coloreye" measures light reflectance of a sample compared to a standard at three wavelengths in the visible light spectrum. The standard used in this study was an enamel containing the black from Run 4–388 as the pigment. The lower reflectivity readings are considered the most desirable since lower reflectivity indicates greater absorption and darker color. Tone was determined by measuring reflectance at the three wavelengths:

X=red     Y=green     Z=blue

The tone of a particular enamel is obtained in accordance with the procedure described on pages 18, 19 and 20 of the above-mentioned "manual." Essentially the procedure involves plotting X, Y and Z readings obtained on a special graph paper wherein the X, Y and Z axis are arranged parallel to each other. One of the following three types of curves result:

(a) Convex upward with a maximum at the top
(b) Convex downward with a valley
(c) Slanting up either to right or left For curves of the convex upward type, the sample had a tone of the shade appearing directly above the peak. Where a valley occurred, the sample tone appeared directly below the valley. On curves going up to right or left, the sample tone was the shade toward which the curve rises. The following data were obtained:

| Enamel | Black in Enamel | Coloreye Relative Reflectance |  |  |
|---|---|---|---|---|
|  |  | X | Y | Z |
| A | 4–388 | 100 | 100 | 100 |
| B | 4–378 | 105.3 | 105.0 | 105.4 |
| C | 4–382 | 119.2 | 119.0 | 119.2 |

Since the lower values indicate less reflectance and hence a greater tinting power of the black, the above data indicates that the tint of an enamel which contains an ordinary furnace black pigment which is not produced in accordance with the teachings of the present invention (4–382) is roughly 20% weaker than an enamel made with our black from Run 4–388.

Since the essence of our invention resides in the deliberate addition of varying amounts of an additive comprising zinc, to the furnace process carbon conversion zone to produce improved carbon black pigments, obviously many incidental modifications in operational techniques and apparatus designs may be utilized without departing from the scope of our invention. Accordingly, various modifications such as methods of introducing additive, and others which would be obvious to those well skilled in the art are contemplated by our invention and may be utilized without departing from the scope thereof.

Having described our invention what we claim as new and desire to secure by U.S. Letters Patent is:

1. In the furnace process for making carbon black wherein a fluid hydrocarbon raw material is heated to dissociation temperatures by means of a combustion reaction conducted in direct contact with said hydrocarbon within an enclosed conversion zone the improvement which comprises controlling the quality of the carbon black product obtained by supplying to said conversion zone at a controlled rate an additive chosen from the group consisting of elemental zinc and zinc compounds in amounts sufficient to provide to said conversion zone between about 100 and about 100,000 parts of zinc per million parts of said hydrocarbon, the proportion of zinc to hydrocarbon being directly related to the degree of quality adjustment needed in said black.

2. The process of claim 1 wherein the zinc is supplied to said zone in a chemically combined form.

3. The process of claim 1 wherein the said additive is a water soluble compound of zinc.

4. The process of claim 1 wherein the said additive is a zinc halide.

5. In the furnace process for making carbon black, wherein a fluid hydrocarbon raw material is heated to dissociation temperature by means of a combustion reaction conducted in direct contact with said hydrocarbon within an enclosed conversion zone, the improvement which comprises controlling the quality of the carbon black product obtained by supplying to said conversion zone at a controlled rate, an additive chosen from the group consisting of elemental zinc and zinc componds in amounts sufficient to provide to said conversion zone between about 300 to about 25,000 parts of zinc per million parts of said hydrocarbon, the proportion of zinc to hydrocarbon being directly related to the degree of quality adjustment needed in said black.

6. The process of claim 5 wherein the zinc is supplied to said zone in a chemically combined form.

7. The process of claim 5 wherein the said additive is a water soluble compound of zinc.

8. The process of claim 5 wherein the said additive is a zinc halide.

9. A composition of matter consisting essentially of a carbonaceous black pigment and from about 100 to about 25,000 parts per million parts by weight of the carbon therein of zinc, said zinc being intimately, and permanently associated with said carbon and substantially uniformly distributed within the lattice structure of said black pigment.

References Cited by the Examiner

UNITED STATES PATENTS

| | | | |
|---|---|---|---|
| 2,920,976 | 1/1960 | Damusis | 106—307 |
| 3,010,795 | 11/1961 | Friauf et al. | 106—307 |
| 3,094,428 | 6/1963 | Hamilton et al. | 106—307 |

TOBIAS E. LEVOW, *Primary Examiner.*